US012633508B2

(12) United States Patent
Kondo et al.

(10) Patent No.: US 12,633,508 B2
(45) Date of Patent: May 19, 2026

(54) ION DETECTOR AND ANALYZER

(71) Applicant: HAMAMATSU PHOTONICS K.K., Hamamatsu (JP)

(72) Inventors: Junichi Kondo, Hamamatsu (JP); Takeshi Endo, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 218 days.

(21) Appl. No.: 18/645,668

(22) Filed: Apr. 25, 2024

(65) Prior Publication Data

US 2024/0404814 A1 Dec. 5, 2024

(30) Foreign Application Priority Data

Jun. 5, 2023 (JP) ................................. 2023-092359

(51) Int. Cl.
| | |
|---|---|
| *G01N 27/62* | (2021.01) |
| *G01N 27/68* | (2006.01) |
| *H01J 43/10* | (2006.01) |
| *H01J 49/02* | (2006.01) |

(52) U.S. Cl.
CPC ............ *H01J 49/025* (2013.01); *G01N 27/62* (2013.01); *G01N 27/68* (2013.01); *H01J 43/10* (2013.01)

(58) Field of Classification Search
CPC ......... G01N 27/62; G01N 27/68; H01J 43/10; H01J 49/025
See application file for complete search history.

(56) References Cited

U.S. PATENT DOCUMENTS

| | | | |
|---|---|---|---|
| 4,810,882 A | 3/1989 | Bateman | |
| 2019/0259591 A1* | 8/2019 | Kobayashi | H01J 43/06 |
| 2019/0259594 A1* | 8/2019 | Kobayashi | H01J 49/26 |
| 2020/0185208 A1* | 6/2020 | Shichi | H01J 49/025 |
| 2020/0350153 A1* | 11/2020 | Kodera | H01J 43/10 |
| 2023/0162962 A1* | 5/2023 | Chen | H01J 49/061 |
| | | | 250/282 |

FOREIGN PATENT DOCUMENTS

| | | | | |
|---|---|---|---|---|
| JP | 2011-086403 A | 4/2011 | | |
| WO | WO-2018211611 A1 * | 11/2018 | ............ | H01J 49/061 |

* cited by examiner

*Primary Examiner* — Mark R Gaworecki
(74) *Attorney, Agent, or Firm* — Faegre Drinker Biddle & Reath LLP

(57) ABSTRACT

An ion detector includes a conversion dynode including a conversion region where electrons are emitted by incident ions, an electron multiplier including an electron incident surface on which the electrons are incident, and an aperture electrode including an aperture through which the electrons traveling from the conversion region to the electron incident surface pass. The conversion region is a region protruding toward a space where the electrons are emitted.

11 Claims, 4 Drawing Sheets

ION DETECTOR AND ANALYZER

TECHNICAL FIELD

The present disclosure relates to an ion detector and an analyzer.

BACKGROUND

An ion detector that includes a conversion dynode that emits electrons by incident ions, an electron multiplier that multiplies the electrons emitted from the conversion dynode, and an aperture electrode that focuses the electrons emitted from the conversion dynode on an electron incident surface of the electron multiplier has been known (see, for example, Japanese Unexamined Patent Publication No. 2011-086403).

SUMMARY

In the ion detector described above, there is a case where a potential having a large absolute value is applied to the conversion dynode in order to increase conversion efficiency from ions to electrons, but in this case, it is difficult to reduce a distance between the conversion dynode and the aperture electrode due to the need to secure a withstand voltage. Therefore, it is conceivable to reduce a potential difference between the conversion dynode and the aperture electrode and to reduce the distance between the conversion dynode and the aperture electrode by bringing the potential applied to the aperture electrode close to the potential applied to the conversion dynode. However, in this case, the electrons emitted from the conversion dynode are easily influenced not only by an electric field formed by the potential difference between the conversion dynode and the aperture electrode but also by an electric field formed by a potential difference between the conversion dynode and the electron incident surface, and there is a concern that the electrons emitted from the conversion dynode are focused in front of the electron incident surface and are incident on the electron incident surface in a divergent state. As a result, the amount of electrons incident on the electron incident surface decreases, and there is a concern that ion detection efficiency decreases.

An object of the present disclosure is to provide an ion detector and an analyzer capable of achieving both downsizing and improvement in ion detection efficiency.

An ion detector according to an aspect of the present disclosure includes a conversion dynode including a conversion region where electrons are emitted by incident ions, an electron multiplier including an electron incident surface on which the electrons are incident, and an aperture electrode including an aperture through which the electrons traveling from the conversion region to the electron incident surface pass. The conversion region is a region protruding toward a space where the electrons are emitted.

BRIEF DESCRIPTION OF THE DRAWINGS

FIGS. 3A and 3B are diagrams illustrating an example of an electric field distribution formed in the ion detector.

DETAILED DESCRIPTION

Figure 1:
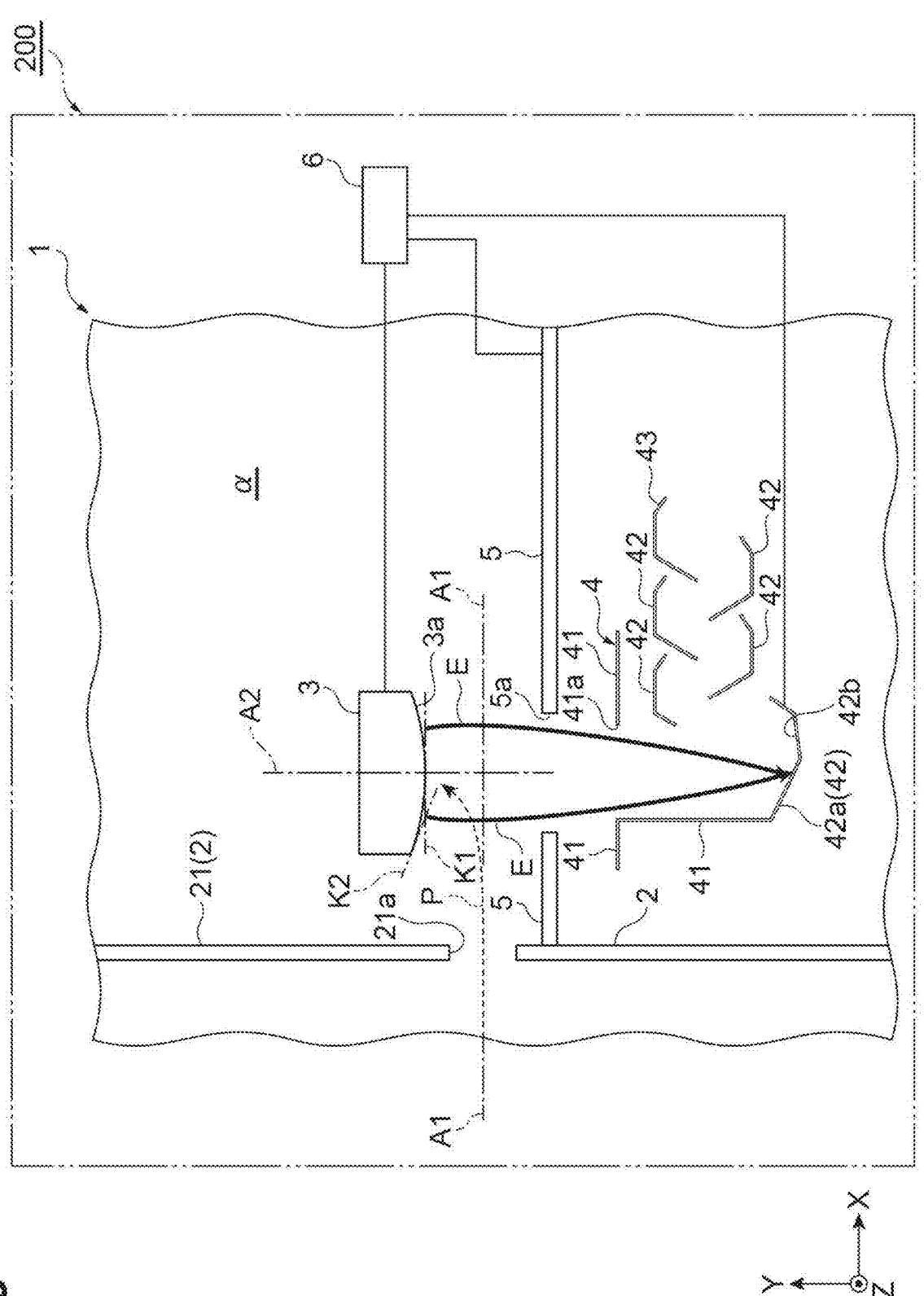
FIG. 1 is a configuration diagram of an ion detector according to an embodiment.

Hereinafter, an embodiment of the present disclosure will be described in detail with reference to the drawings. Note that, in the drawings, identical or corresponding parts are denoted by identical reference signs, and redundant description will be omitted.

As illustrated in FIG. 1, an ion detector 1 includes a partition 2, a conversion dynode 3, an electron multiplier 4, an aperture electrode 5, and a potential application unit 6. The ion detector 1 is housed inside an ion detector housing case (not illustrated) in a mass spectrometer (analyzer) 200, and is disposed within a vacuum space. A material of the partition 2 is, for example, metal such as stainless steel. The partition 2 is a plate-shaped member of which a thickness direction is an X-axis direction. An ion incident opening 21a is formed in a wall 21 of the partition 2. The ion incident opening 21a has a center line A1 parallel to the X-axis direction. A shape of the ion incident opening 21a viewed from the X-axis direction is, for example, a circular shape. Hereinafter, one direction perpendicular to the X-axis direction is referred to as a Y-axis direction, and a direction perpendicular to both the X-axis direction and the Y-axis direction is referred to as a Z-axis direction. Note that, the ion incident opening 21a is disposed such that the center line A1 of the ion incident opening 21a intersects a center line A2 of an aperture 5a to be described later and an extension direction of a conversion region 3a to be described later. In the present embodiment, all the center line A1 of the ion incident opening 21a, the center line A2 of the aperture 5a, and the extension direction of the conversion region 3a perpendicularly intersect, and correspond to the X-axis direction, the Y-axis direction, and the Z-axis direction, respectively.

In the present embodiment, the ion detector 1 is used as a part of the mass spectrometer 200. In the mass spectrometer 200, a sample is ionized by irradiating the sample with a deuterium lamp for photoionization, for example. The mass spectrometer 200 selects ions P to be measured from generated ions by using, for example, a quadrupole. The ions P to be measured are introduced into the ion detector 1 through the ion incident opening 21a. The ion detector 1 detects the incident ions P. Although the ion detector 1 can detect the ions P whether the ions P are positive ions or negative ions, the ions P are described as the positive ions in the present embodiment. In addition, a potential of the ion detector housing case (not illustrated) is described as a ground potential.

The conversion dynode 3 has a surface including the conversion region 3a. The ions P are incident, and thus, the conversion region 3a emits electrons E. A material of the conversion dynode 3 is, for example, metal such as stainless steel. The conversion dynode 3 is supported by a support member (not illustrated). The conversion dynode 3 is disposed on one side in the Y-axis direction with respect to the center line A1. The conversion region 3a faces the other side (center line A1 side) in the Y-axis direction on a plane α including a center line A1 and perpendicular to the Z-axis direction. The conversion region 3a has a center line coinciding with the center line A2 of the aperture 5a (center line A2 included in the plane α and parallel to the Y-axis direction) to be described later. The conversion region 3a does not overlap the ion incident opening 21a but overlaps the wall 21 as viewed from the X-axis direction. Accordingly, it is possible to suppress incidence of stray light, which is generated in the mass spectrometer 200 and may be noise, on the conversion dynode 3.

A first potential is applied to the conversion dynode 3 by the potential application unit 6. The first potential is a potential having a polarity opposite to a polarity of the ions P, and is a negative potential in the present embodiment. As an example, the first potential is −10 kV. Accordingly, the incident ions P travel toward the conversion region 3*a* while being gradually separated from the center line A1 of the ion incident opening 21*a* toward one side in the Y-axis direction. Then, the ions P are incident on the conversion region 3*a* with an energy of, for example, 10 keV, and thus, the electrons E are emitted from the conversion region 3*a*. The amount of electrons E to be emitted increases as the energy of the ions P incident on the conversion region 3*a* increases. That is, the higher an absolute value of the first potential, the higher conversion efficiency from the ions P to the electrons E can be.

The electron multiplier 4 is disposed on the other side (side opposite to the conversion dynode 3) in the Y-axis direction with respect to the center line A1. In the present embodiment, the electron multiplier 4 includes a wall 41 made of metal, a plurality of dynodes 42, and an anode 43. The electron multiplier 4 is supported by a support member (not illustrated). An electron passage opening 41*a* through which the electrons E pass is formed in the wall 41. The electron passage opening 41*a* faces the conversion region 3*a* in the Y-axis direction, and has a center line coinciding with the center line A2. A shape of the electron passage opening 41*a* viewed from the Y-axis direction is, for example, a circular shape. The plurality of dynodes 42 and the anode 43 are lined up on the plane α. Materials of each dynode 42 and the anode 43 are, for example, metal such as stainless steel. Among the plurality of dynodes 42, a first-stage dynode 42*a* faces the electron passage opening 41*a* in the Y-axis direction and has an electron incident surface 42*b*. Note that, the electron incident surface 42*b* in the electron multiplier 4 is a portion where the electrons E emitted from the conversion region 3*a* of the conversion dynode 3 are incident first on the electron multiplier 4. In the electron multiplier 4, the electrons E having passed through the electron passage opening 41*a* are incident on the electron incident surface 42*b* of the first-stage dynode 42*a*, and thus, secondary electrons (not illustrated) are emitted from the first-stage dynode 42*a*. The secondary electrons are multiplied by each dynode 42 at a subsequent stage and are incident on the anode 43. The anode 43 is configured to output the secondary electrons as a pulse signal. In addition, the electron incident surface 42*b* of the first-stage dynode 42*a* extends in the extension direction of the conversion region 3*a* to be described later, that is, along the Z-axis direction in the present embodiment. That is, the electron incident surface 42*b* of the first-stage dynode 42*a* extends to face the conversion region 3*a*, and is formed to have a recessed region with respect to a protruding region of the conversion region 3*a*.

A second potential is applied to the first-stage dynode 42*a* by the potential application unit 6. That is, the second potential is applied to the electron incident surface 42*b* by the potential application unit 6. The second potential is higher than the first potential of the conversion dynode 3. As an example, the second potential is −2 kV. A predetermined potential is applied to each dynode 42 other than the first-stage dynode 42*a* by the potential application unit 6 such that the secondary electrons emitted from the first-stage dynode 42*a* sequentially travel to each dynode 42 at a subsequent stage. The anode 43 is set to the ground potential. In the ion detector 1, the second potential is applied to the wall 41 of the electron multiplier 4 by the potential application unit 6.

The aperture electrode 5 is disposed between the conversion dynode 3 and the electron multiplier 4. More specifically, the aperture electrode 5 is disposed on the other side (side opposite to the conversion dynode 3) in the Y-axis direction with respect to the center line A1. In the present embodiment, the aperture electrode 5 is a plate-shaped electrode of which a thickness direction is the Y-axis direction, and extends along a plane perpendicular to the Y-axis direction to partition a space where the conversion dynode 3 is disposed and a space where the electron multiplier 4 is disposed. A material of the aperture electrode 5 is, for example, metal such as stainless steel. In the aperture electrode 5, the aperture 5*a* through which the electrons E traveling from the conversion region 3*a* to the first-stage dynode 42*a* pass is formed. The aperture 5*a* faces each of the conversion region 3*a* and the first-stage dynode 42*a* on the plane α, and has the center line A2 included in the plane α and parallel to the Y-axis direction. A shape of the aperture 5*a* viewed from the Y-axis direction is, for example, a circular shape.

A third potential is applied to the aperture electrode 5 by the potential application unit 6. The third potential is equal to or higher than the first potential of the conversion dynode 3 and lower than the second potential of the first-stage dynode 42*a*. As an example, the third potential is −9.5 kV.

The potential application unit 6 applies a predetermined potential to each of the conversion dynode 3, the electron multiplier 4, and the aperture electrode 5. The potential application unit 6 is electrically connected to each of the conversion dynode 3, the electron multiplier 4, and the aperture electrode 5 by a wiring or the like. As described above, the potential application unit 6 applies the first potential (for example, −10 kV) to the conversion dynode 3, applies the second potential (for example, −2 kV) higher than the first potential to the first-stage dynode 42*a* of the electron multiplier 4, and applies the third potential (for example, −9.5 kV) equal to or higher than the first potential and lower than the second potential to the aperture electrode 5. In the present embodiment, the potential application unit 6 applies a predetermined potential to each of the conversion dynode 3, the electron multiplier 4, and the aperture electrode 5 such that a difference between the first potential (for example, −10 kV) and the third potential (for example, −9.5 kV) is smaller than a difference between the second potential (for example, −2 kV) and the third potential (for example, −9.5 kV). The potential application unit 6 may be disposed in the ion detector housing case (not illustrated) or may be disposed outside the ion detector housing case (not illustrated). As an example, the potential application unit 6 may be a power supply unit capable of supplying a plurality of potentials, for example, a power supply unit including a plurality of high-voltage generation units and a control unit thereof, or may be constituted of a power supply unit or the like including a high-voltage generation unit constituted of a single booster and resistance division, and a control unit thereof.

In the present embodiment, the conversion region 3*a* faces the electron incident surface 42*b* of the first-stage dynode 42*a* with the aperture 5*a* and the electron passage opening 41*a* interposed therebetween. The conversion region 3*a*, the aperture 5*a*, the electron passage opening 41*a*, the plurality of dynodes 42, and the anode 43 are lined up on the plane α. The center line A2 of the aperture 5*a* intersects the center line A1 of the ion incident opening 21*a*, and is orthogonal in the present embodiment. Each of the center line of the conversion region 3a and the center line of the electron passage opening 41a coincides with the center line A2 of the aperture 5a. In other words, the aperture 5a, the conversion region 3a, and the electron passage opening 41a have the same center line A2. As viewed from the Y-axis direction, an outer edge of the aperture 5a is positioned inside an outer edge of the conversion region 3a. As viewed from the Y-axis direction, an outer edge of the electron passage opening 41a is positioned inside the outer edge of the aperture 5a.

In the ion detector 1 having the above-described configuration, a predetermined potential is applied to each of the conversion dynode 3, the electron multiplier 4, and the aperture electrode 5 by the potential application unit 6. In this state, the ions P are incident from the ion incident opening 21a, and the ions P travel toward the conversion region 3a of the conversion dynode 3 by a formed electric field. Then, when the ions P are incident on the conversion region 3a, the electrons E are emitted from the conversion region 3a. The electrons E emitted from the conversion region 3a pass through the aperture 5a of the aperture electrode 5 and the electron passage opening 41a of the electron multiplier 4, and are incident on the electron incident surface 42b of the first-stage dynode 42a. When the electrons E are incident on the electron incident surface 42b of the first-stage dynode 42a, the secondary electrons (not illustrated) are emitted from the electron incident surface 42b of the first-stage dynode 42a. The secondary electrons are multiplied by each dynode 42 at a subsequent stage and are incident on the anode 43. Then, the anode 43 outputs the secondary electrons as the pulse signal, and thus, the ion detector 1 detects the ions P. The aperture electrode 5 suppresses the incidence of the electrons or ions, which may be noise, on the electron multiplier 4.

Figure 2:
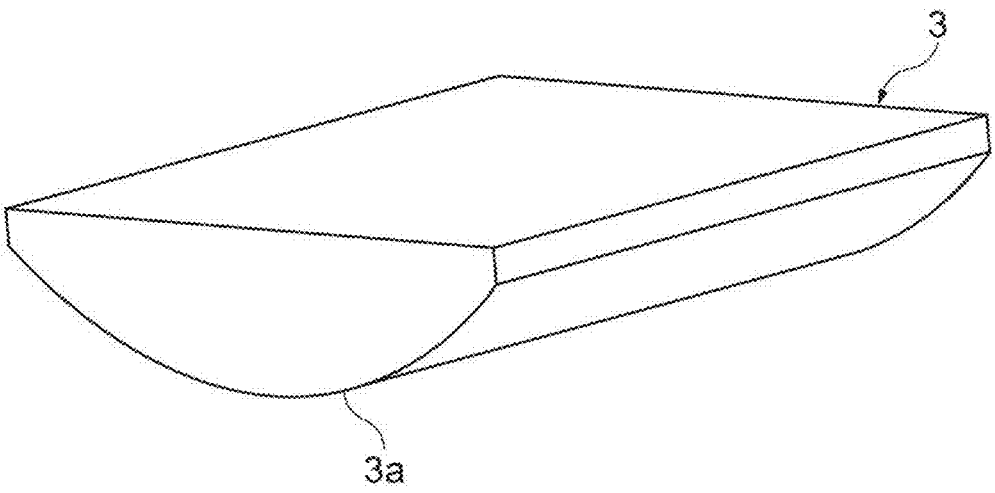
FIG. 2 is a perspective view of a conversion dynode included in the ion detector illustrated in FIG. 1.

As illustrated in FIGS. 1 and 2, the conversion region 3a is a region protruding to a space where the electrons E are emitted. In the ion detector 1, the conversion region 3a is a protruding region that is line-symmetric with respect to the center line A2 as viewed from the Z-axis direction perpendicular to the plane α (direction perpendicular to the center line A2 of the aperture 5a). That is, a vertex of the conversion region 3a is positioned on the center line A2 as viewed from the Z-axis direction. In addition, the conversion region 3a is formed such that the protruding region extends in the Z-axis direction perpendicular to the plane α (direction intersecting the center line A2 of the aperture 5a, in the present embodiment, direction intersecting the center line A2 perpendicularly). The conversion region 3a is a smooth curved region, and maintains the same sectional shape along the Z-axis direction. That is, in the conversion dynode 3 in the present embodiment, the conversion region 3a has a shape in which an arcuate portion gently projecting toward the space where the electrons E are emitted is formed to continuously extend in a direction perpendicular to the center line A1 of the ion incident opening 21a and the center line A2 of the aperture 5a. The conversion dynode 3 is an electrode in which end surfaces connecting a surface opposite to the conversion region 3a and the conversion region 3a are formed as flat surfaces, and have an electrical connection portion with the potential application unit 6 on any one of the end surfaces. An angle formed by a first virtual surface K1 in contact with the vertex of the conversion region 3a and a second virtual surface K2 in contact with a point of the conversion region 3a other than the vertex is, for example, larger than 0 degrees and equal to or smaller than 60 degrees.

As described above, in the ion detector 1, the conversion dynode 3 has the conversion region 3a that is the region protruding to the space where the electrons E are emitted. Accordingly, when the ions P are incident on the conversion region 3a, the electrons E diverge and are emitted from the conversion region 3a. Accordingly, even in a case where a potential having a large absolute value is applied to the conversion dynode 3, a distance between the conversion dynode 3 and the aperture electrode 5 can be reduced, and an electric field capable of focusing the electrons E emitted from the conversion region 3a on the electron incident surface 42b can be formed. Thus, in accordance with the ion detector 1, it is possible to achieve both downsizing and improvement in ion detection efficiency.

In the ion detector 1, the conversion region 3a faces the electron incident surface 42b of the electron multiplier 4 with the aperture 5a of the aperture electrode 5 interposed therebetween. Accordingly, the electric field capable of focusing the electrons E emitted from the conversion region 3a on the electron incident surface 42b can be easily and reliably formed. Accordingly, the electrons E emitted from the conversion region 3a can be reliably incident on the electron incident surface 42b.

In the ion detector 1, the conversion region 3a is a protruding region that is line-symmetric with respect to the center line A2 as viewed from the Z-axis direction perpendicular to the center line A2 of the aperture 5a. Accordingly, the electric field capable of focusing the electrons E emitted from the conversion region 3a on the electron incident surface 42b can be more easily and more reliably formed. Accordingly, the electrons E emitted from the conversion region 3a can be more reliably incident on the electron incident surface 42b.

In the ion detector 1, the conversion region 3a is formed such that the protruding region extends in the direction intersecting the center line A2 of the aperture 5a. Accordingly, the conversion region 3a in which the emitted electrons E can be reliably incident on the electron incident surface 42b extends in the direction intersecting the center line A2 of the aperture 5a. In other words, an area of the conversion region 3a along the direction intersecting the center line A2 of the aperture 5a increases. Accordingly, the ion detection efficiency can be further improved.

The ion detector 1 includes the partition 2 having the ion incident opening 21a to which the ions P incident on the conversion dynode 3 are introduced. The ion incident opening 21a is disposed such that the center line A1 of the ion incident opening 21a intersects the center line A2 of the aperture 5a and the extending direction of the conversion region 3a. The electron incident surface 42b of the electron multiplier 4 extends along the extending direction of the conversion region 3a. Accordingly, it is possible to improve ion detection accuracy by setting incidence conditions of the electrons E emitted from the conversion region 3a on the electron incident surface 42b to be uniform in the extending direction and setting electron multiplication conditions on the electron incident surface 42b of the electron multiplier 4 to be uniform in the extending direction.

In the ion detector 1, the conversion region 3a is a smooth curved region. Accordingly, a divergent state of the electrons E emitted from the conversion region 3a can be set to a desired divergent state. Accordingly, the electrons E emitted from the conversion region 3a can be reliably incident on the electron incident surface 42b.

In the ion detector 1, the angle formed by the first virtual surface K1 in contact with the vertex of the conversion region 3a and the second virtual surface K2 in contact with the point of the conversion region 3*a* other than the vertex is larger than 0 degrees and equal to or smaller than 60 degrees. Accordingly, it is possible to suppress excessive divergence of the electrons E emitted from the conversion region 3*a*. Accordingly, the electrons E emitted from the conversion region 3*a* can be reliably incident on the electron incident surface 42*b*.

The ion detector 1 includes the potential application unit 6 that applies the first potential to the conversion dynode 3, applies the second potential to the electron incident surface 42*b* of the electron multiplier 4, and applies the third potential to the aperture electrode 5. The second potential is higher than the first potential, and the third potential is equal to or higher than the first potential and lower than the second potential. Due to the use of the potential application unit 6, the distance between the conversion dynode 3 and the aperture electrode 5 can be reduced, and the electric field capable of appropriately focusing the electrons E emitted from the conversion region 3*a* on the electron incident surface 42*b* can be specifically formed.

In the ion detector 1, the difference between the first potential and the third potential is smaller than the difference between the second potential and the third potential. Accordingly, a potential difference between the conversion dynode 3 and the aperture electrode 5 can be further reduced, and the distance between the conversion dynode 3 and the aperture electrode 5 can be further reduced.

In the ion detector 1, the conversion region 3*a*, the aperture 5*a*, and the plurality of dynodes 42 are lined up on the plane α, and the conversion region 3*a* is the protruding region as viewed from the Z-axis direction perpendicular to the plane α. Accordingly, since a trajectory of the electrons E is formed along the plane α, a design of each unit of the ion detector 1 can be facilitated.

Figures 3A, 3B:
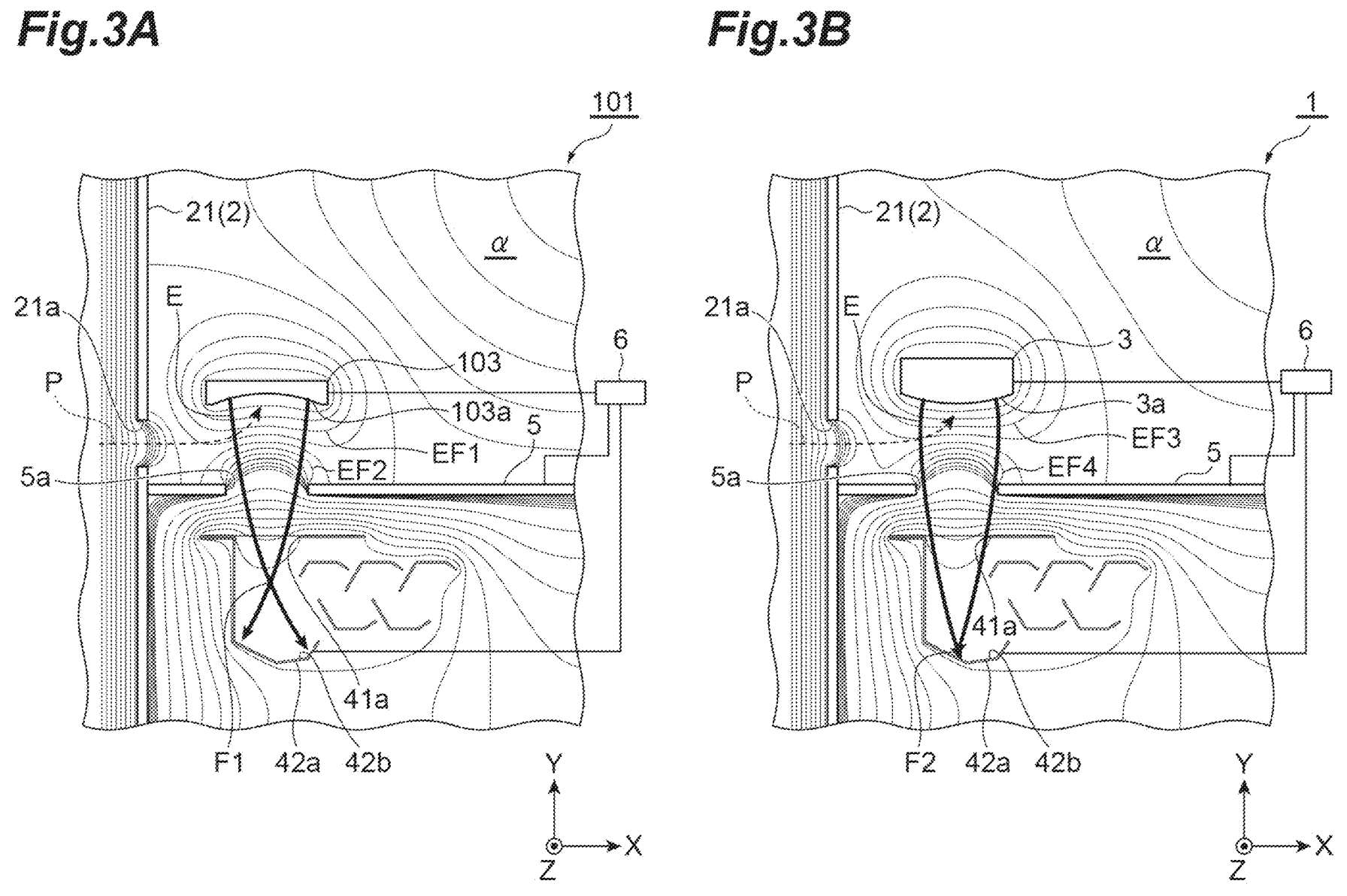

Advantages of the shape of conversion region 3*a* described above will be described with reference to FIGS. 3A and 3B. In FIG. 3A, an electric field distribution formed in an ion detector 101 different from the ion detector 1 described above is indicated by an equipotential line. The ion detector 101 is different from the ion detector 1 in that a shape of a conversion region 103*a* included in a conversion dynode 103 is different from the shape of the conversion region 3*a*. The conversion region 103*a* is a region recessed on a side opposite to the space where the electrons E are emitted, and has a shape adopted in a general conversion dynode of the related art. In the ion detector 101, the conversion region 103*a* is a recessed region that is line-symmetric with respect to the center line A2 (see FIG. 1) as viewed from the Z-axis direction perpendicular to the plane α (direction perpendicular to the center line A2 of the aperture 5*a*). In FIG. 3B, an electric field distribution formed in the ion detector 1 described above is indicated by an equipotential line. Note that, as described above, the first potential of the conversion dynode 3 and the conversion dynode 103 is −10 kV, the second potential of the first-stage dynode 42*a* is −2 kV, and the third potential of the aperture electrode 5 is −9.5 kV. Due to the application of such a potential to each member, in the ion detector 1, the electric field is formed such that the electrons E emitted from the conversion region 3*a* travel to the first-stage dynode 42*a*, and in the ion detector 101, the electric field is formed such that the electrons E emitted from the conversion region 103*a* travel to the first-stage dynode 42*a*.

As illustrated in FIG. 3A, the electrons E emitted from conversion region 103*a* first travel to the aperture 5*a* under influence of an electric field EF1 formed near the conversion region 103*a*. Subsequently, the electrons E are focused under influence of an electric field EF2 formed near the aperture 5*a*. The electric field EF2 spreads from the aperture 5*a* toward the conversion region 103*a*. That is, as viewed from the Z-axis direction, the electrons E are focused on the center line A2 (see FIG. 1) of the aperture 5*a*. In a case where the distance between the conversion region 103*a* and the aperture electrode 5 is small, since the influence of the electric field EF2 on the electrons E increases, the electrons E are easily focused. Accordingly, in the ion detector 101, the electrons E are focused in front of the first-stage dynode 42*a* and are incident on the electron incident surface 42*b* of the first-stage dynode 42*a* in the divergent state.

As illustrated in FIG. 3B, in the ion detector 1, the electrons E are first emitted in a direction divergent from the conversion region 3*a*. This is because the conversion region 3*a* is the protruding region and the electrons E are easily emitted along the direction perpendicular to the conversion region 3*a*. In addition, the emitted electrons E further diverge under influence of an electric field EF3 formed in the vicinity of the conversion region 3*a*. That is, in the ion detector 1, the electrons E diverge due to the shape of the conversion region 3*a*, and also diverge under the influence of the electric field EF3. Subsequently, the electrons E are focused under influence of an electric field EF4 formed near the aperture 5*a*. The electric field EF4 spreads from the aperture 5*a* toward the conversion region 3*a*. In the ion detector 1, since the electrons E are divergent, even in a case where the influence of the electric field EF4 on the electrons E is large, a convergence point F2 of the electrons E can be brought close to the first-stage dynode 42*a*. Accordingly, in the ion detector 1, the convergence point F2 of the electron E is closer to the first-stage dynode 42*a* than a convergence point F1 in the ion detector 101. As a result, in the ion detector 1, since the electrons E are incident on the electron incident surface 42*b* of the first-stage dynode 42*a* in a state of being focused, the amount of electrons E incident on the electron incident surface 42*b* of the first-stage dynode 42*a* increases as compared with the case of the ion detector 101. Note that, the convergence point F2 may be positioned on the electron incident surface 42*b* of the first-stage dynode 42*a*.

Figure 4:
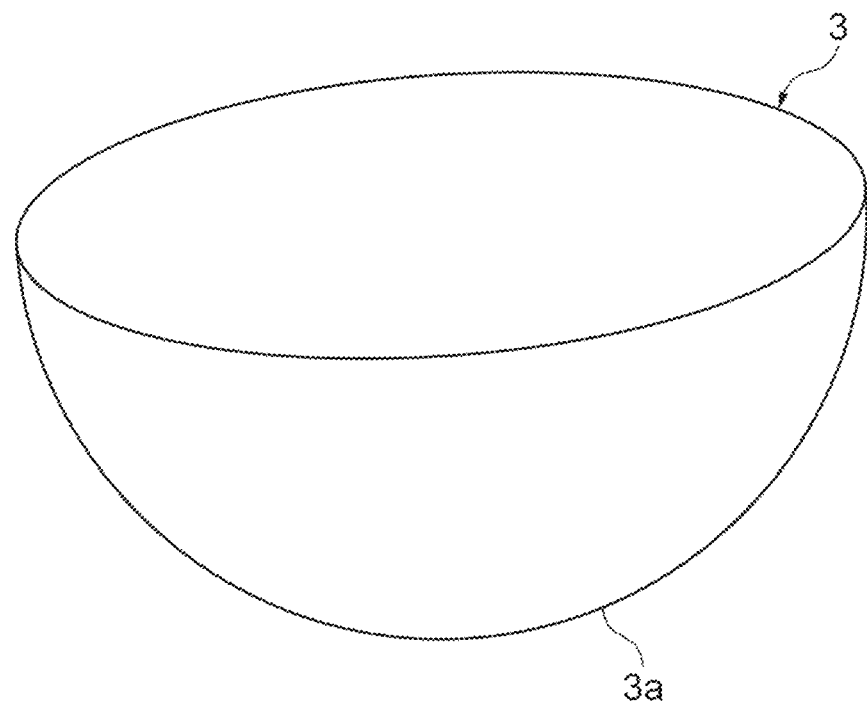
FIG. 4 is a perspective view of a conversion dynode according to a modification.

The present disclosure is not limited to the above embodiment. In the ion detector 1, the conversion region 3*a* of the conversion dynode 3 is the smooth curved region and maintains the same sectional shape along the Z-axis direction, but the conversion region 3*a* may be any region as long as the region protrudes to the space where the electrons E are emitted. As an example, the conversion region 3*a* may have a polygonal shape instead of the smooth curved surface, or may be a hemispherical region as illustrated in FIG. 4. As another example, the conversion dynode 3 may include a pyramidal portion, and the conversion region 3*a* may be a surface of the pyramidal portion.

In the ion detector 1, the partition 2 may form an enclosure space surrounding the conversion dynode 3 together with the aperture electrode 5. As an example, the shape of the partition 2 may be a box shape. In this case, the electric field around the conversion dynode 3 can be stabilized, and the conversion from the ions to the electrons in the conversion dynode 3 can be stably performed.

In the ion detector 1, one potential application unit 6 applies a predetermined potential to each of the conversion dynode 3, the electron multiplier 4, and the aperture electrode 5, but each of the plurality of potential application units 6 may apply a predetermined potential to at least one of the conversion dynode 3, the electron multiplier 4, and the aperture electrode 5.

In the ion detector 1, the angle formed by the first virtual surface K1 and the second virtual surface K2 is larger than 0 degrees and equal to or smaller than 60 degrees, but the angle formed by the first virtual surface K1 and the second virtual surface K2 may exceed 60 degrees.

In the ion detector 1, the electron multiplier 4 has a structure having a dynode structure, but the electron multiplier 4 may be a channel type electron multiplier, a micro-channel plate, or a semiconductor detector. In addition, the electron multiplier 4 may be a combination of a microchannel plate and a semiconductor detector, or a combination of a scintillator and a photomultiplier tube.

In the ion detector 1, the conversion region 3a may not face the electron incident surface 42b of the electron multiplier 4 with the aperture 5a of the aperture electrode 5 interposed therebetween. As an example, the conversion region 3a may face one side (center line A2 side) in the X-axis direction on the plane α. As viewed from the Y-axis direction, the outer edge of the aperture 5a may be positioned outside the outer edge of the conversion region 3a.

In the ion detector 1, the potential application unit 6 applies the first potential (for example, −10 kV) to the conversion dynode 3, applies the second potential (for example, −2 kV) to the first-stage dynode 42a of the electron multiplier 4, and applies the third potential (for example, −9.5 kV) to the aperture electrode 5, but the values of the first potential, the second potential, and the third potential are not limited to the above values. As another example, for example, in a case where the negative ions are detected as the ions P, the potential application unit 6 may apply a first potential (for example, +10 kV) to the conversion dynode 3, apply a second potential (for example, +11 kV) to the first-stage dynode 42a of the electron multiplier 4, and apply a third potential (for example, +10.5 kV) to the aperture electrode 5. That is, the potential application unit 6 may apply a predetermined potential to each of the conversion dynode 3, the electron multiplier 4, and the aperture electrode 5 such that the difference between the first potential and the third potential becomes equal to or larger than the difference between the second potential and the third potential.

The ion detector 1 may be used as a part of a mass spectrometer using time of flight (TOF), or may be used as a part of a mass spectrometer using plasma as an ion source.

An ion detector according to an aspect of the present disclosure is [1] "an ion detector including a conversion dynode including a conversion region where electrons are emitted by incident ions, an electron multiplier including an electron incident surface on which the electrons are incident, and an aperture electrode including an aperture through which the electrons traveling from the conversion region to the electron incident surface pass, in which the conversion region is a region protruding toward a space where the electrons are emitted".

In the ion detector according to the above [1], the conversion dynode includes the conversion region that is the region protruding to the space where the electrons are emitted. Accordingly, when the ions are incident on the conversion region, the electrons diverge and are emitted from the conversion region. Accordingly, even in a case where a potential having a large absolute value is applied to the conversion dynode, the distance between the conversion dynode and the aperture electrode can be reduced, and the electric field capable of appropriately focusing the electrons emitted from the conversion region on the electron incident surface can be formed. Thus, in accordance with the ion detector according to the above [1], it is possible to achieve both downsizing and improvement in ion detection efficiency.

The ion detector according to an aspect of the present disclosure may be [2] "the ion detector according to the above [1], in which the conversion region faces the electron incident surface of the electron multiplier with the aperture of the aperture electrode interposed therebetween". In accordance with the ion detector according to the above [2], it is possible to easily and reliably form the electric field capable of focusing the electrons emitted from the conversion region on the electron incident surface. Accordingly, the electrons emitted from the conversion region can be reliably incident on the electron incident surface.

The ion detector according to an aspect of the present disclosure may be [3] "the ion detector according to the above [2], in which the conversion region is a protruding region that is line-symmetric with respect to a center line of the aperture as viewed from a direction perpendicular to the center line". In accordance with the ion detector according to the above [3], it is possible to more easily and more reliably form the electric field capable of focusing the electrons emitted from the conversion region on the electron incident surface. Accordingly, the electrons emitted from the conversion region can be more reliably incident on the electron incident surface.

The ion detector according to an aspect of the present disclosure may be [4] "the ion detector according to the above [3], in which the conversion region is formed such that the protruding region extends in a direction intersecting the center line of the aperture". In accordance with the ion detector according to the above [4], the conversion region capable of causing the emitted electrons to be more reliably incident on the electron incident surface extends in the direction intersecting the center line of the aperture, and thus, it is possible to further improve the ion detection efficiency.

The ion detector according to an aspect of the present disclosure may be [5] "the ion detector according to the above [4] further includes a partition including an ion incident opening to which the ions incident on the conversion dynode are introduced, in which the ion incident opening is disposed such that a center line of the ion incident opening intersects the center line of the aperture and an extending direction of the conversion region, and the electron incident surface of the electron multiplier extends along the extending direction of the conversion region". In accordance with the ion detector according to the above [5], it is possible to improve the ion detection accuracy by setting the incidence conditions of the electrons emitted from the conversion region on the electron incident surface to be uniform in the extending direction and setting the electron multiplication conditions on the electron incident surface of the electron multiplier to be uniform in the extending direction.

The ion detector according to an aspect of the present disclosure may be [6] "the ion detector according to the above [5], in which the partition forms an enclosure space surrounding the conversion dynode together with the aperture electrode". In accordance with the ion detector according to the above [6], the electric field around the conversion dynode can be stabilized, and the conversion from the ions to the electrons in the conversion dynode can be stably performed.

The ion detector according to an aspect of the present disclosure may be [7] "the ion detector according to any one of the above [1] to [6], in which the conversion region is a curved region". In accordance with the ion detector according to the above [7], the divergent state of the electrons emitted from the conversion region can be set to a desired divergent state. Accordingly, the electrons emitted from the conversion region can be reliably incident on the electron incident surface.

The ion detector according to an aspect of the present disclosure may be [8] "the ion detector according to any one of the above [1] to [7], in which an angle formed by a first virtual surface in contact with a vertex of the conversion region and a second virtual surface in contact with a point of the conversion region other than the vertex is larger than 0 degrees and equal to or lower than 60 degrees". In accordance with the ion detector according to the above [8], it is possible to suppress the excessive divergence of the electrons emitted from the conversion region. Accordingly, the electrons emitted from the conversion region can be reliably incident on the electron incident surface.

The ion detector according to an aspect of the present disclosure may be [9] "the ion detector according to any one of the above [1] to [8] further includes a potential application unit which applies a first potential to the conversion dynode, applies a second potential to the electron incident surface of the electron multiplier, and applies a third potential to the aperture electrode, in which the second potential is higher than the first potential, and the third potential is equal to or higher than the first potential and lower than the second potential". In accordance with the ion detector according to the above [9], due to the use of the potential application unit, the distance between the conversion dynode and the aperture electrode can be reduced, and the electric field capable of appropriately focusing the electrons emitted from the conversion region on the electron incident surface can be specifically formed.

The ion detector according to an aspect of the present disclosure may be "the ion detector according to the above [9], in which a difference between the first potential and the third potential is smaller than a difference between the second potential and the third potential". In accordance with the ion detector according to the above [10], the potential difference between the conversion dynode and the aperture electrode can be further reduced, and the distance between the conversion dynode and the aperture electrode can be further reduced.

The analyzer according to an aspect of the present disclosure may be "an analyzer using the ion detector according to any one of the above [1] to [10]". In accordance with the analyzer according to the above [11], it is possible to achieve both downsizing and improvement in ion detection efficiency.

In accordance with the present disclosure, it is possible to provide the ion detector and the analyzer capable of achieving both downsizing and improvement in ion detection efficiency.

What is claimed is:

1. An ion detector comprising:
a conversion dynode including a conversion region where electrons are emitted by incident ions;
an electron multiplier including an electron incident surface on which the electrons are incident; and an aperture electrode including an aperture through which the electrons traveling from the conversion region to the electron incident surface pass, wherein
the conversion region is a region protruding toward a space where the electrons are emitted.

2. The ion detector according to claim 1, wherein
the conversion region faces the electron incident surface of the electron multiplier with the aperture of the aperture electrode interposed therebetween.

3. The ion detector according to claim 2, wherein
the conversion region is a protruding region that is line-symmetric with respect to a center line of the aperture as viewed from a direction perpendicular to the center line.

4. The ion detector according to claim 3, wherein
the conversion region is formed such that the protruding region extends in a direction intersecting the center line of the aperture.

5. The ion detector according to claim 4, further comprising:
a partition including an ion incident opening to which the ions incident on the conversion dynode are introduced, wherein
the ion incident opening is disposed such that a center line of the ion incident opening intersects the center line of the aperture and an extending direction of the conversion region, and
the electron incident surface of the electron multiplier extends along the extending direction of the conversion region.

6. The ion detector according to claim 5, wherein
the partition forms an enclosure space surrounding the conversion dynode together with the aperture electrode.

7. The ion detector according to claim 1, wherein
the conversion region is a curved region.

8. The ion detector according to claim 1, wherein
an angle formed by a first virtual surface in contact with a vertex of the conversion region and a second virtual surface in contact with a point of the conversion region other than the vertex is larger than 0 degrees and equal to or lower than 60 degrees.

9. The ion detector according to claim 1, further comprising:
a potential application unit which applies a first potential to the conversion dynode, applies a second potential to the electron incident surface of the electron multiplier, and applies a third potential to the aperture electrode, wherein
the second potential is higher than the first potential, and
the third potential is equal to or higher than the first potential and lower than the second potential.

10. The ion detector according to claim 9, wherein
a difference between the first potential and the third potential is smaller than a difference between the second potential and the third potential.

11. An analyzer using the ion detector according to claim 1.

* * * * *